(12) United States Patent
Ha et al.

(10) Patent No.: US 12,049,861 B2
(45) Date of Patent: Jul. 30, 2024

(54) RENEWABLE ENERGY GENERATION SYSTEM

(71) Applicants: Hyundai Motor Company, Seoul (KR); Kia Corporation, Seoul (KR)

(72) Inventors: Dong Hyun Ha, Seoul (KR); Jung Hun Choi, Hwaseong-Si (KR); Jae Wung Jung, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 40 days.

(21) Appl. No.: 17/978,549

(22) Filed: Nov. 1, 2022

(65) Prior Publication Data

US 2023/0265821 A1   Aug. 24, 2023

(30) Foreign Application Priority Data

Feb. 21, 2022 (KR) .......................... 10-2022-0022437

(51) Int. Cl.
*F03B 13/16* (2006.01)
*F03B 13/22* (2006.01)

(52) U.S. Cl.
CPC .............. *F03B 13/16* (2013.01); *F03B 13/22* (2013.01); *F05B 2220/706* (2013.01); *F05B 2220/708* (2013.01)

(58) Field of Classification Search
CPC .......... F03B 13/16; F03B 13/22; F03B 13/14; F03B 13/20; F05B 2220/706; F05B 2220/708; Y02E 10/30
USPC ............................................. 290/4 A, 42, 53
See application file for complete search history.

(56) References Cited

U.S. PATENT DOCUMENTS

| | | | | |
|---|---|---|---|---|
| 4,434,375 A | * | 2/1984 | Taylor | F03B 13/1885 60/504 |
| 4,672,222 A | * | 6/1987 | Ames | F03B 13/1895 290/53 |
| 6,109,029 A | * | 8/2000 | Vowles | F03B 13/1815 60/497 |
| 8,629,572 B1 | * | 1/2014 | Phillips | F03B 13/16 290/53 |
| 11,248,580 B2 | * | 2/2022 | Moffat | F03B 13/18 |
| 11,879,421 B2 | * | 1/2024 | Moffat | B63B 22/02 |
| 2007/0224895 A1 | * | 9/2007 | Draper | B63B 21/50 441/3 |
| 2011/0057448 A1 | * | 3/2011 | Page | F03B 13/20 290/53 |
| 2011/0121572 A1 | * | 5/2011 | Levchets | F03B 13/20 290/53 |
| 2012/0286508 A1 | * | 11/2012 | Poddey | F03D 9/008 290/42 |

* cited by examiner

*Primary Examiner* — Charles Reid, Jr.
(74) *Attorney, Agent, or Firm* — MORGAN, LEWIS & BOCKIUS LLP

(57) ABSTRACT

A renewable energy generation system includes a renewable energy power generator including a capsule shape including a tumbling doll shape, floating on the sea, and producing electrical power by converting wave energy into electrical energy; a first hub connected to the renewable energy power generator and configured to store the electrical energy; and a cable configured to transmit the electrical energy produced by the renewable energy power generator to the first hub by connecting the renewable energy power generator to one or more of another renewable energy power generators and the first hub.

15 Claims, 6 Drawing Sheets

RENEWABLE ENERGY GENERATION SYSTEM

CROSS-REFERENCE TO RELATED APPLICATIONS

The present application claims priority to Korean Patent Application No. 10-2022-0022437, filed on Feb. 21, 2022, the entire contents of which is incorporated herein for all purposes by this reference.

BACKGROUND OF THE PRESENT DISCLOSURE

Field of the Present Disclosure

The present disclosure relates to a renewable energy generation system.

Description of Related Art

The description in the present section merely provides background information related to the present disclosure and does not necessarily form the related art.

Thermal power generation using chemical energy from fossil fuels to produce electric power, hydropower generation using the potential energy of water stored in dams, nuclear power generation using nuclear fission of uranium are among the most widely used technologies for producing electric power.

However, in recent years, resource depletion, safety issues, and eco-friendly values are increasingly propelling renewable energy productions in proportion over the three major power generation sources. Renewable energy includes power generation using infinite energy sources such as solar power, solar heat, tidal power, wave power, wind power, and geothermal heat.

More than 70% of the earth's surface is the sea that borders different countries with large bodies of water making them good environmental candidates to take advantage of the infinite energy of the waters, which garners increasing interest in wave power generation. Wave power generation refers to the production of electrical energy by use of the periodic perpendicular motion of the water surface caused by waves.

Large-scale wave power generation has spatial limitations to onshore installation. Also, mounting a wave power generation device in distant seas and coastal and offshore waters faces difficulties in energy transfer and requires mounting costly subsea cables, incurring considerable expenses.

Furthermore, when a wave power generation system is provided at a seashore close to the ground, there is a problem in that it is difficult to expand the scale due to spatial limitation.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a renewable energy generation system including: a renewable energy power generator including a capsule shape including a tumbling doll shape, floating on the sea, and producing electrical power by converting wave energy into electrical energy; a first hub connected to the renewable energy power generator and configured to store the electrical energy; and a cable configured to transmit the electrical energy produced by the renewable energy power generator to the first hub by connecting the renewable energy power generator to one or more of another renewable energy power generators and the first hub.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
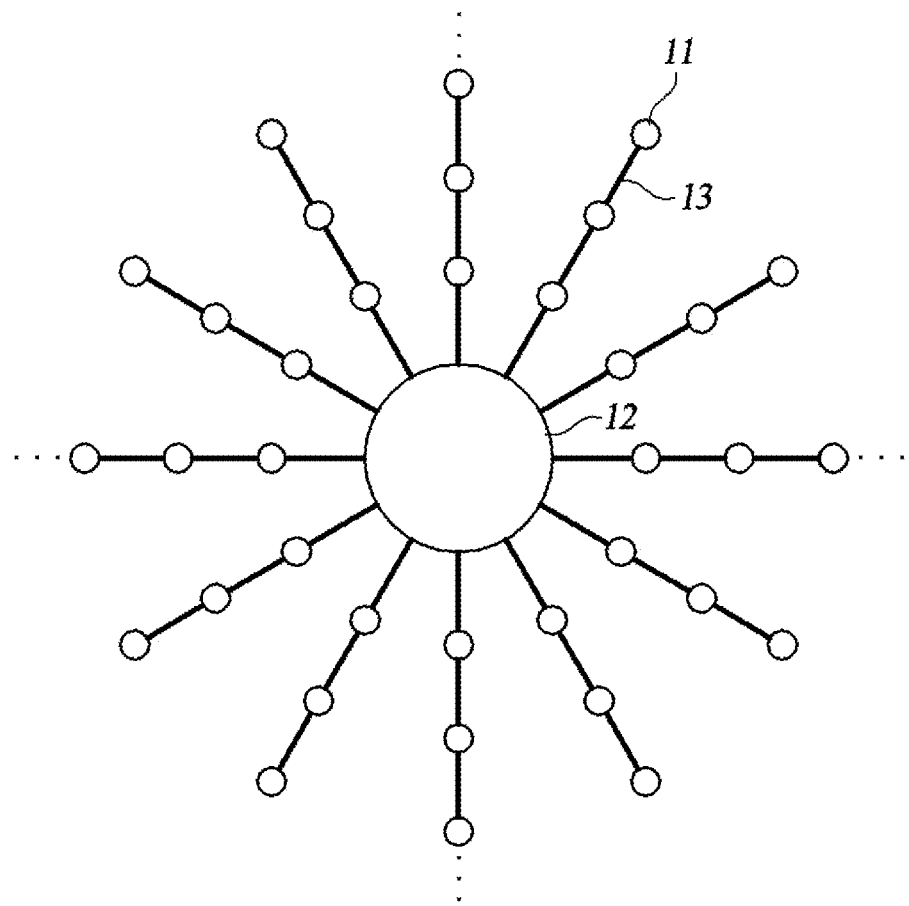
FIG. 1 is a diagram showing the connection relationship of a renewable energy generation system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A renewable energy generation system according to an exemplary embodiment can produce and store power by converting wave energy into electrical energy in costal and distant seas and can transport the electrical energy to the ground using a specific transportation.

A renewable energy generation system according to an exemplary embodiment has a combination of a plurality of renewable energy power generators and a plurality of hubs, so that the scale of the renewable energy generation system may be expanded.

The aspects of the present disclosure are not limited to the foregoing, and other aspects not mentioned herein will be able to be clearly understood to those skilled in the art from the following description.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a diagram showing the connection relationship of a renewable energy generation system according to an exemplary embodiment of the present disclosure.

Referring to FIG. 1, a renewable energy generation system 1 includes all or some of a renewable energy power generator 11, a first hub 12 and a cable 13.

Multiples of renewable energy power generator 11 may be interconnected by use of a cable 13, and they may float in the coastal waters and distant seas. The plurality of renewable energy generators 11 may each be shaped as a roly-poly toy or capsule. The plurality of renewable energy generators 11 may each convert wave energy into electrical energy to produce electric power.

A solar panel 1150 may be provided on the surface of the renewable energy power generator 11. A solar panel 1150 may be provided at the upper portion of the surface of the renewable energy power generator 11, that is, a portion which is not submerged in seawater. The renewable energy power generator 11 can not only convert wave energy into electrical energy, but also convert solar energy into electrical energy using the solar panel 1150.

The cable 13 may connect the renewable energy power generator 11 to each other or the renewable energy power generator 11 and the first hub 12. The first hub 12 may be positioned to be surrounded by a plurality of renewable energy power generator 11. The first hub 12 is floating in the sea and may have a disk shape.

The first hub 12 may be connected to the plurality of renewable energy power generator 11 and the cable 13 to receive electrical energy from the renewable energy power generator 11. The first hub 12 may receive electrical energy from the renewable energy power generator 11 and store the electrical energy. The electrical energy transferred to the first hub 12 may charge a battery and a vehicle coupled to the first hub 12. In the instant case, the vehicle may be an Unmanned Aerial Vehicle (UAV), unmanned ship, or a drone.

Figure 2:
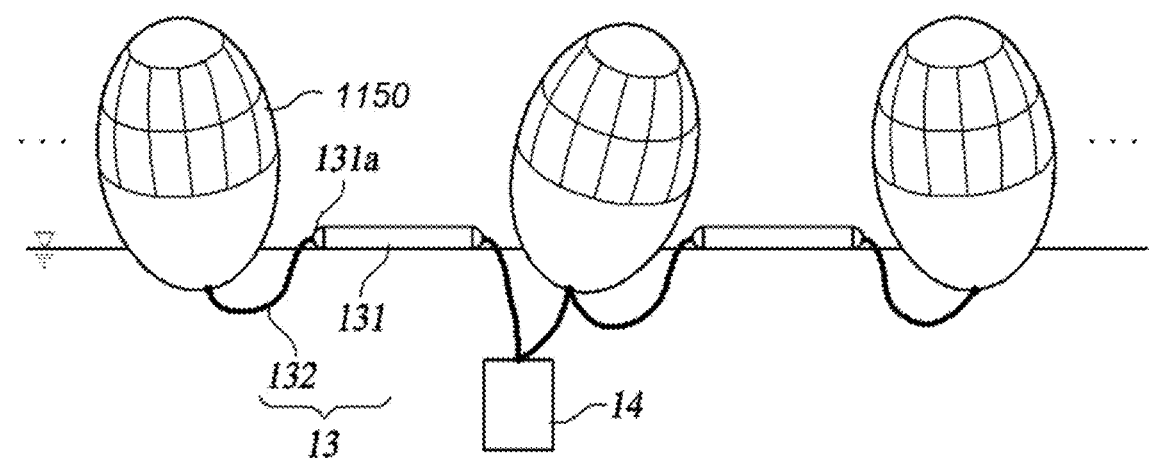
FIG. 2 is a diagram showing the connection relationship of a renewable energy power generator of the renewable energy generation system according to an exemplary embodiment of the present disclosure.

FIG. 2 is a diagram showing the connection relationship of a renewable energy power generator of the renewable energy generation system according to an exemplary embodiment of the present disclosure.

Referring to FIG. 2, the cable 13 of the renewable energy generation system 1 may include a float unit 131 and a flexible unit 132. A first end portion of the flexible unit 132 may be connected to both end portions of the float unit 131. A second end portion of the flexible unit 132 may be connected to the renewable energy power generator 11 or the first hub 12. The cable 13 can transmit the electricity produced by the renewable energy power generator 11 to the first hub 12.

The float units 131 float on the sea and can prevent a collision between a plurality of renewable energy power generators 11. The float unit 131 may include a stopper 131a at both end portions. The stopper 131a can attenuate shock which is applied to the renewable energy power generator 11 and the float unit 131 when the renewable energy power generator 11 and the float unit 131 collide with each other. The flexible unit 132 may be implemented in a wire type in order not to interfere with movement of the renewable energy power generator 11 that produces power.

Referring to FIG. 2, the renewable energy generation system 1 may further include an amplification panel 14. The amplification panel 14 can additionally produce electrical energy in correspondence to variation of a flow rate under the sea even if there is no wave on the sea level. The amplification panel 14 may be connected to the renewable energy power generator 11 using the cable 13. The electrical energy additionally produced by the amplification panel 14 may be transmitted to the first hub 12 using the cable 13.

Figure 3:
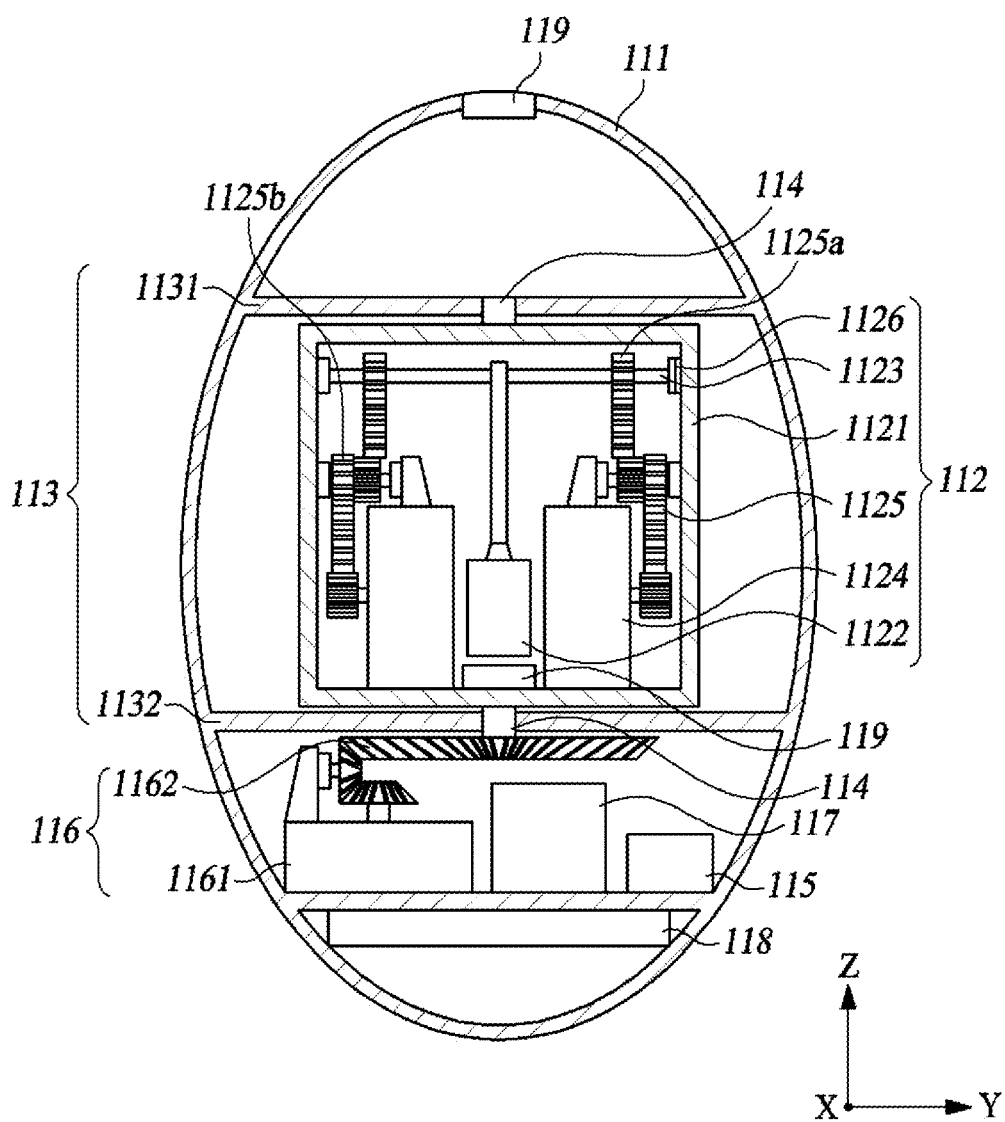
FIG. 3 is a cross-sectional view taken along a plane perpendicular to an x-axis of the renewable energy power generator of the renewable energy generation system according to an exemplary embodiment of the present disclosure.

FIG. 3 is a cross-sectional view taken along a plane perpendicular to an x-axis of the renewable energy power generator of the renewable energy generation system according to an exemplary embodiment of the present disclosure.

In the specification, a z-axial direction is a direction perpendicular to the sea level, an x-axis is a direction which is perpendicular to the z-axis and parallel with motion of the pendulum 1122, and a y-axis is a direction perpendicular to the x-axis and the z-axis.

Referring to FIG. 3, the renewable energy power generator 11 may include all or some of a housing 111, a main generation unit 112, a frame 113, a main rotation shaft 114, a controller 115, an auxiliary generation unit 116, a solar generator 117, a battery 118, and a communication module 119.

The housing 111 may have a capsule shape including a tumbling doll shape to be able to float in costal and distant seas. A solar panel may be provided on the surface of the housing 111. The communication module 119 may be provided on the top portion of the housing 111. It is possible to determine absolute values x, y, z of the renewable energy power generator 11 using an Ultra Wide Band (UWB) communication module 119 based on an ultra wide band. That is, it is possible to control behavior of the renewable energy power generator 11 by monitoring an inclination state of the renewable energy power generator 11 and determining a tilt angle.

The frame 113 may include an upper frame 1131 and a lower frame 1132. The upper frame 1131 and the lower frame 1132 may be fixed in the housing 111 with a predetermined gap in the z-axial direction thereof. The main generation unit 112 may be connected between the upper frame 1131 and the lower frame 1132. In detail, the main rotation shaft 114 may be connected to the upper frame 1131 and the lower frame 1132 and may connect the main generation unit 112 so that the main generation unit 112 may be rotated.

The main generation unit 112 may include all or some of an internal housing 1121, a pendulum 1122, a pendulum rotation shaft 1123, a main motor 1124, a gear unit 1125, and a rotation angle sensor 1126.

The main generation unit 112 can produce power by converting wave energy into electrical energy using movement of the pendulum 1122. The pendulum 1122 in the main generation unit 112 is moved by movement of waves and the kinetic energy of the pendulum 1122 is converted into electrical energy. Motion of the pendulum 1122 may be transmitted to the main motor 1124 through the pendulum rotation shaft 1123 and the gear unit 1125. The main motor 1124 can produce and store electrical energy in the battery 118. The main motor 1124 may be operated in a power generation mode for producing electrical energy.

The gear unit 1125 may include a first gear unit 1125a and a second gear unit 1125b. The gear unit 1125 amplifies motion of the pendulum by a gear ratio, being able to increase the power generation efficiency of the renewable energy power generator 11. For example, when the gear ratio of the first gear unit 1125a is 10:1 and the gear ratio of the second gear unit 1125b is 10:1, the gear unit 1125 has a gear ratio of a total of 100:1. When the gear unit 1125 has a gear ratio of 100:1, the number of rotations of the main motor 1124 may be amplified 100 times the movement of the pendulum 1122 when the pendulum 1122 is moved. That is, it is possible to produce a large amount of electrical energy in comparison to motion of the pendulum 1122.

The auxiliary generation unit 116 may include an auxiliary motor 1161 and an auxiliary gear unit 1162. The auxiliary gear unit 1162 may be connected to the main rotation shaft 114 and the auxiliary motor 1161 may be connected to the auxiliary gear unit 1162. The auxiliary generation unit 116 may be provided outside the main generation unit 112. In detail, auxiliary generation unit 116 may be provided at the lower end portion of the lower frame 1132.

Moment of rotational inertia may be generated in the main generation unit 112 by movement of the pendulum 1122 due to a variation of waves. When the main generation unit 112 is rotated by moment of rotational inertia, the rotation of the main generation unit 112 may be transmitted to the auxiliary generation unit 116 through the main rotation shaft 114 and the auxiliary gear unit 1162. The auxiliary motor 1161 can additionally produce and store electrical energy in the battery 118. By use of the main generation unit 112 and the auxiliary generation unit 116, the renewable energy power generator 11 can convert various wave energies such as rolling, pitching, yawing, potential energy, and up, down, left and right kinetic energies into electrical energy. In the instant case, the auxiliary motor 1161 may be operated in a power generation mode for producing electrical energy.

Motion of the pendulum 1122 is made in only one direction, so it is difficult to stably produce power due to irregular movement of currents. That is, it is difficult to stably generate electricity in correspondence to the flow of the sea level, so there is a problem that power cannot be efficiently produced.

A controller 115 of the renewable energy power generator 11 can control the renewable energy power generator 11 in consideration of the intensity, the rate, the frequency, etc. of waves. For example, the controller 115 can increase the power generation efficiency of the renewable energy power generator 11 by rotating the renewable energy power generator 11 in consideration of the intensity, the rate, the frequency, etc. of waves. The controller 115 can control behavior of the renewable energy power generator 11 to efficiently use various wave energies such as rolling, pitching, yawing, potential energy, and up, down, left and right kinetic energies. The controller 115 operates the renewable energy power generator 11 by controlling the main motor 1124 and the auxiliary motor 1161 in a driving mode, whereby the renewable energy power generator 11 can efficiently produce electrical energy.

The solar generator 117 can control solar energy absorbed by the solar panel into electrical energy. The battery 118 can temporarily store the electrical energy produced by the main motor 1124 and the auxiliary motor 1161 and can transmit the electrical energy to a predetermined place using the cable 13. Furthermore, the battery 118 can supply energy for controlling the main motor 1124 and the auxiliary motor 1161 in the driving mode, energy for operating a gyro sensor and the communication module 119, and energy for operating the solar generator 117.

Referring to FIG. 3, the solar generator 117, the controller 115, and the battery 118 may be provided on the bottom inside the housing 111 to lower the center of gravity of the renewable energy power generator 11.

Figure 4:
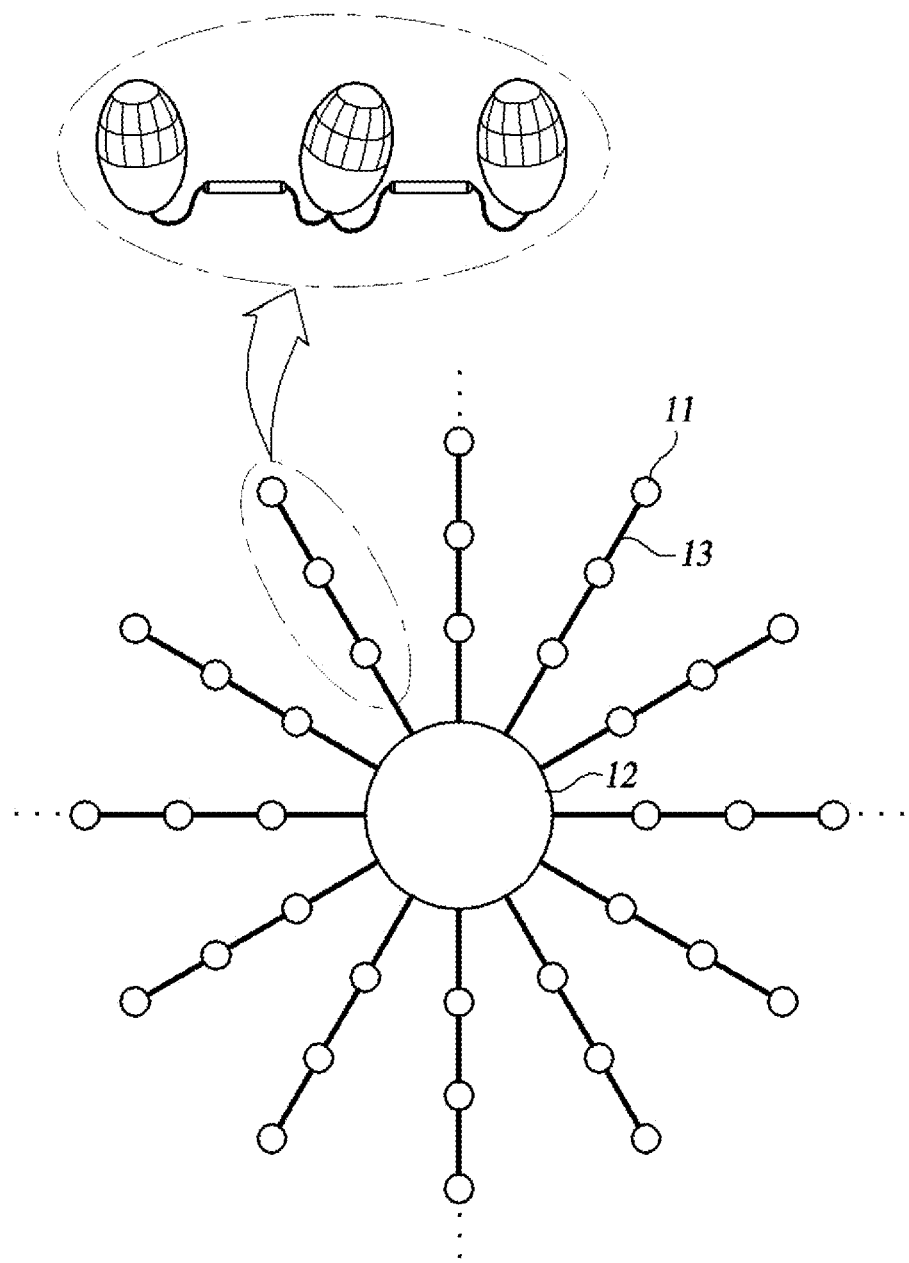
FIG. 4 is a diagram showing the connection relationship of a first hub and the renewable energy power generator of the renewable energy generation system according to an exemplary embodiment of the present disclosure.

FIG. 4 is a diagram showing the connection relationship of a first hub and the renewable energy power generator of the renewable energy generation system according to an exemplary embodiment of the present disclosure.

Figure 5:
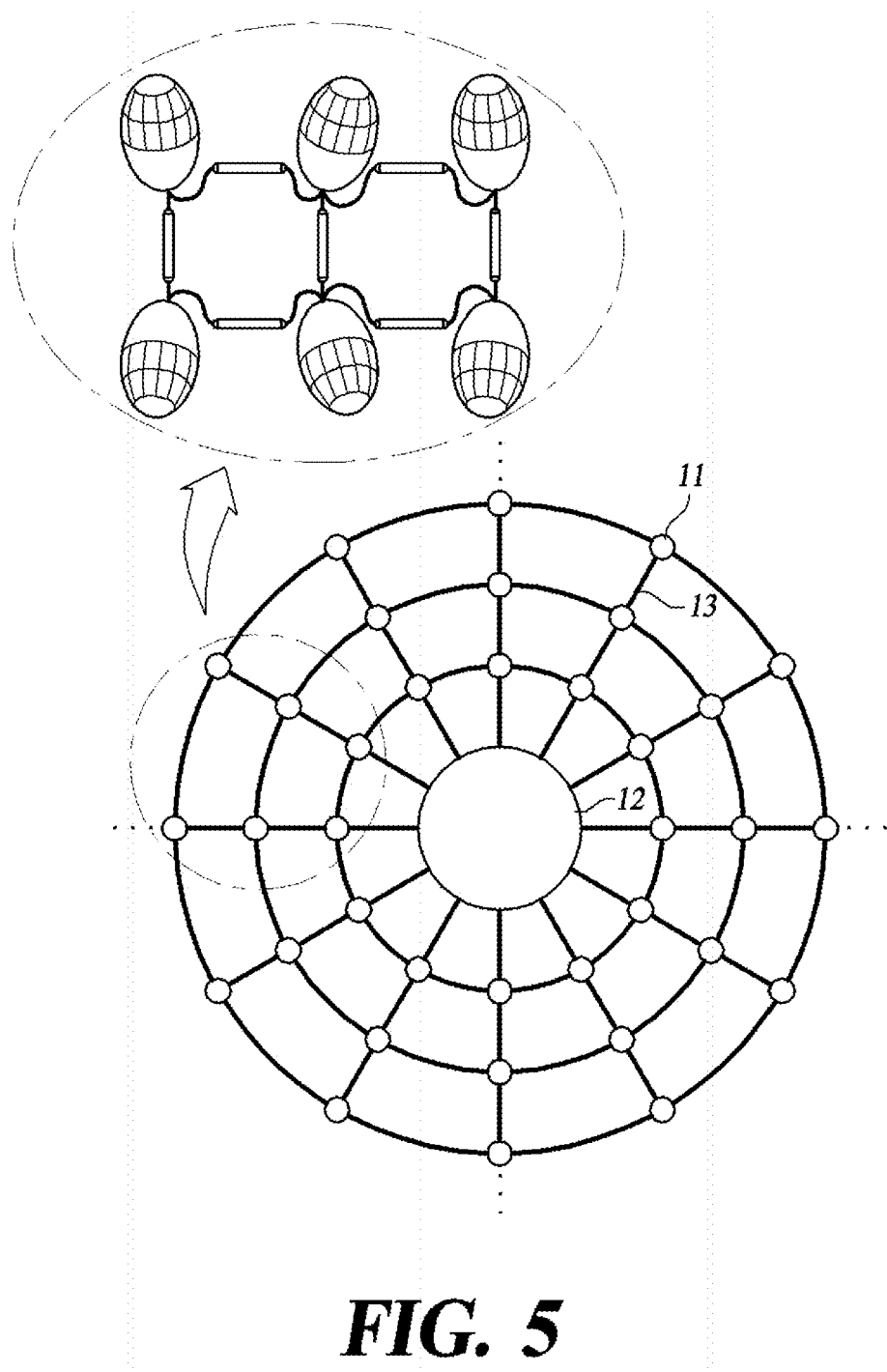
FIG. 5 is a diagram showing the connection relationship of a first hub and the renewable energy power generator of the renewable energy generation system according to another exemplary embodiment of the present disclosure.

FIG. 5 is a diagram showing the connection relationship of a first hub and the renewable energy power generator of the renewable energy generation system according to another exemplary embodiment of the present disclosure.

Referring to FIG. 4, a first hub 12 of a renewable energy generation system 1 according to an exemplary embodiment of the present disclosure may be positioned to be surrounded by a plurality of renewable energy power generators 11. The first hub 12 is connected to a plurality of renewable energy power generators 11 through the cables 13, being able to receive electrical energy from the plurality of renewable energy power generators 11. The first hub 12 can receive and store electrical energy from the plurality of renewable energy power generators 11.

FIG. 4 is a diagram showing the state in which a plurality of renewable energy power generators 11 are connected to each other in series. FIG. 5 is a diagram showing the state in which a plurality of renewable energy power generators 11 are connected to each other in parallel. The structure of the renewable energy generation system 1 is not limited thereto, and the plurality of renewable energy power generators 11 may be connected to each other through various embodiments. The renewable energy generation system 1 may be contracted or expanded by connecting a plurality of renewable energy power generators 11, depending on the power generation capacity. Furthermore, the present disclosure is not limited to a single renewable energy generation system 1 and a plurality of renewable energy generation systems 1 may be collected, forming a cluster. A cluster formed by collecting a plurality of renewable energy generation systems 1 is described in detail hereafter.

Figure 6:
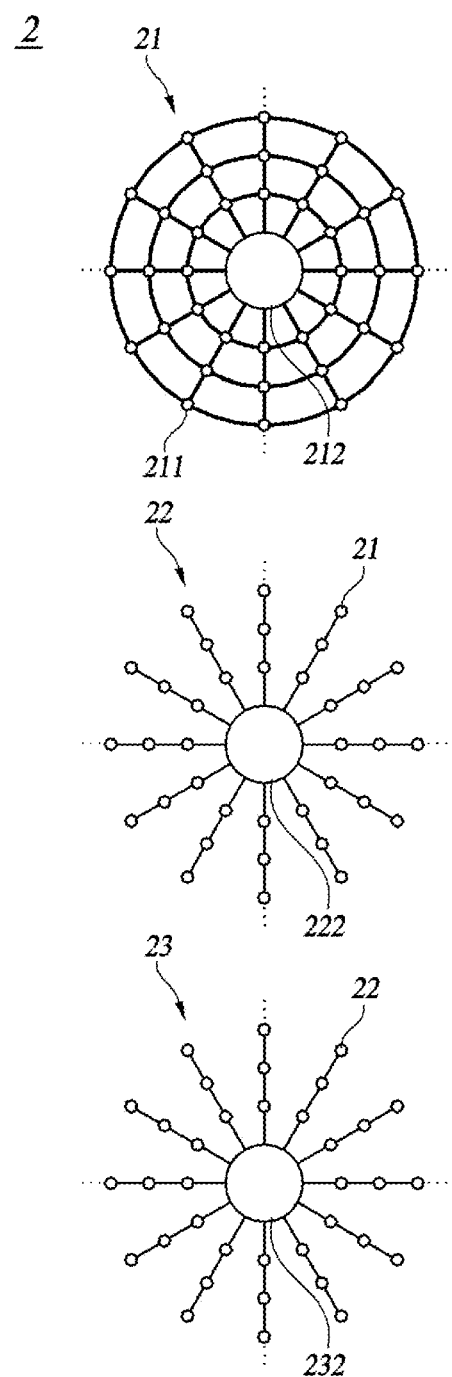
FIG. 6 is a diagram showing the relationship between a first cluster and a second cluster of a renewable energy power generation cluster according to an exemplary embodiment of the present disclosure.

FIG. 6 is a diagram showing the relationship between a first cluster and a second cluster of a renewable energy power generation cluster according to another exemplary embodiment of the present disclosure.

Referring to FIG. 6, a renewable energy generation cluster 2 may include all or some of a first cluster 21, a second cluster 22, and a third cluster 23.

The first cluster 21 may include a first hub 212 and a plurality of renewable energy power generators 211. The first cluster 21 may be a type which is same as or corresponds to the renewable energy generation system 1 of FIG. 1. The above description is referred to for the same or corresponding components in relation to the first hub and the renewable energy power generator 211, and the components are not described below.

The first hub 212 and a plurality of renewable energy power generators 211 surrounding the first hub 212 may form a first cluster 21. The first hub 212 and the plurality of renewable energy power generators 211 may be connected through cables. The renewable energy generation cluster 2 according to an exemplary embodiment of the present disclosure may include a plurality of first clusters 21.

The second cluster 22 may include a second hub 222 and a plurality of first clusters 21. The second hub 222 may be positioned to be surrounded by a plurality of first clusters 21. The second hub 222 and the plurality of first clusters 21 surrounding the second hub 222 may form a second cluster 22. The renewable energy generation cluster 2 according to an exemplary embodiment of the present disclosure may include a plurality of second clusters 22.

The third cluster 23 may include a third hub 232 and a plurality of second clusters 22. The third hub 232 may be positioned to be surrounded by a plurality of second clusters 22. The third hub 232 and the plurality of second clusters 22 surrounding the third hub 232 may form a third cluster 23. The renewable energy generation cluster 2 according to an exemplary embodiment of the present disclosure may include a plurality of third clusters 23. The structure of the renewable energy generation cluster 2 is not limited thereto and may be contracted or expanded by accumulating a plurality of clusters.

The renewable energy generation cluster 2 according to an exemplary embodiment of the present disclosure may further include a transportation and a battery.

The transportation can transmit electrical energy between the first cluster 21 to the third cluster 23. In detail, the transportation can transmit batteries among the first hub 212, the second hub 222, and the third hub 232, being able to transmit the electrical energy produced by the renewable energy power generator 211. Furthermore, the transportation can transmit batteries to the first hub 212, the second hub 222, the third hub 232, and a specific place on the ground. Here, the specific place may be future mobility such as Electric Vehicle (EV), Purpose Built Vehicle (PBV), Urban Air Mobility (UAM), robot, electric charging station, general home and industrial facility, etc. For example, using Vehicle To Grid (V2G) technology, a rechargeable eco-friendly vehicle may be connected to the power grid to use the remaining power. The eco-friendly vehicle can become a moving energy storage system (ESS) by charging the eco-friendly vehicle using the power grid and then supplying the remaining electricity to the power grid after driving.

The renewable energy generation cluster 2 may convert electrical energy into hydrogen energy and transfer it. When energy is stored for a long time in the first hub 212 to the third hub 232, a large amount of energy (1 TWh or more) may be stored. In the case of large capacity energy, it is more suitable to store it as hydrogen energy rather than electrical energy. Furthermore, because hydrogen energy loses less energy than electrical energy transport, it is suitable for the transport of energy between countries.

According to an exemplary embodiment of the present disclosure, the renewable energy generation system produces power by converting wave energy into electrical energy in costal and distant seas without limit conditions in installation, and utilizes a specific transportation without mounting an expensive submarine table, whereby there is an effect that economics may be increased.

According to an exemplary embodiment of the present disclosure, the renewable energy generation system has a combination of a plurality of renewable energy power generators and a plurality of hubs, so there is an effect that it is possible to increase output of renewable energy by expanding the scale of the renewable energy generation system.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A renewable energy generation system comprising:
    a renewable energy power generator having a capsule shape floating on the sea, and producing electrical power by converting wave energy into electrical energy;
    a first hub connected to the renewable energy power generator and configured to store the electrical energy; and
    a cable configured to transmit the electrical energy produced by the renewable energy power generator to the first hub by connecting the renewable energy power generator to one or more of another renewable energy power generators and the first hub,
    wherein the renewable energy power generator includes a main generation unit comprising:
        a pendulum configured to move by movement of waves, wherein the pendulum is positioned in a middle portion of an interior of the renewable energy power generator;
        a pendulum rotation shaft fixedly attached to the pendulum, wherein the pendulum is fixedly attached to a central portion of the pendulum rotation shaft;
        a motor set configured to convert kinetic energy into the electrical energy; and
        a gear unit connected to an one end portion of the pendulum rotation shaft and the motor set, wherein the gear unit is configured to amplify rotational movement, which is generated from the movement of the pendulum, using a predetermined gear ratio, and to transmit the amplified rotational movement to the motor set.

2. The renewable energy generation system of claim 1, wherein the renewable energy power generators are connected in one or more methods of a series and a row.

3. The renewable energy generation system of claim 1, wherein the renewable energy power generators are aligned to surround the first hub.

4. The renewable energy generation system of claim 1, wherein the renewable energy power generator further includes a solar panel producing the electrical power by converting solar energy into the electrical energy.

5. The renewable energy generation system of claim 1, wherein the cable includes:
    a float unit floating on the sea; and
    a flexible unit configured to connect the float unit to one or more of the renewable energy power generators and the first hub.

6. The renewable energy generation system of claim 5, wherein the float unit includes a stopper at first and second end portions thereof.

7. The renewable energy generation system of claim 1, wherein the first hub floats on the sea and has a disc shape.

8. A renewable energy generation cluster in which a plurality of renewable energy generation systems of claim 1 is arranged, the renewable energy generation cluster including:
    a first cluster including the first hub and the renewable energy power generators connected to the first hub using cables; and
    a second hub surrounded by first clusters.

9. The renewable energy generation cluster of claim 8, wherein the second hub and the first clusters form a second cluster.

10. The renewable energy generation cluster of claim 9, wherein the first clusters are connected to each other in series around the second hub in a radial direction of the second hub.

11. The renewable energy generation cluster of claim 9, further including:
    a third hub surrounded by second clusters,
    wherein the third hub and the second clusters form a third cluster.

12. The renewable energy generation cluster of claim 11, wherein the second clusters are connected to each other in series around the third hub in a radial direction of the third hub.

13. The renewable energy generation system of claim 1,
    wherein the gear unit includes a first gear unit connected to the one end portion of the pendulum rotation shaft and a second gear unit connected to the other end portion of the pendulum rotation shaft, and
    wherein the motor set includes a first motor connected to the first gear unit and a second motor connected to the second gear unit.

14. The renewable energy generation system of claim 13,
    wherein the first gear unit and the second gear unit are positioned symetrically with respect to the pendulum, and
    wherein the first motor and the second motor are positioned symetrically with respect to the pendulum.

15. The renewable energy generation system of claim 1, further comprising a main rotation shaft perpendicular to the pendulum rotation shaft,
    wherein the main generation unit is configured to rotate about the main rotation shaft, by the movement of waves.

* * * * *